United States Patent [19]
White et al.

[11] Patent Number: 6,082,674
[45] Date of Patent: Jul. 4, 2000

[54] AIRCRAFT WINDOW ESCUTHCHEON ASSEMBLY

[75] Inventors: Walter Leon White, Everett, Wash.; Ben Redito Oani, Carson, Calif.

[73] Assignee: McDonnel Douglas Corporation, St. Louis, Mo.

[21] Appl. No.: 09/154,306

[22] Filed: Sep. 16, 1998

[51] Int. Cl.[7] .................................................. B64C 1/14
[52] U.S. Cl. .................................. 244/129.3; 52/787.12; 296/200; 296/97.7
[58] Field of Search ...................... 244/129.3; 52/787.12; 296/200, 97.7, 97.8, 97.9

[56] References Cited

U.S. PATENT DOCUMENTS

| | | | |
|---|---|---|---|
| 2,841,254 | 7/1958 | Millner | 189/75 |
| 3,443,346 | 5/1969 | Eggert, Jr. | 52/214 |
| 4,407,100 | 10/1983 | Huelsekopf | 52/212 |
| 4,541,595 | 9/1985 | Fiala et al. | 244/129.3 |
| 4,612,739 | 9/1986 | Wilson | 52/1 |
| 4,864,786 | 9/1989 | Harris, Jr. | 52/214 |
| 5,271,581 | 12/1993 | Irish | 244/129.3 |
| 5,397,080 | 3/1995 | Berg | 244/129.3 |
| 5,462,243 | 10/1995 | Hart et al. | 244/121 |
| 5,467,943 | 11/1995 | Umeda | 244/129.3 |

*Primary Examiner*—J. Woodrow Eldred
*Attorney, Agent, or Firm*—Alston & Bird LLP

[57] ABSTRACT

An aircraft window escutcheon assembly includes front and back panels having aligned window openings. A dust pane and a window shade are captively retained between the front and back panels. The front and back panels include integral fastening portions which interlock to join the panels, thus securing the entire assembly together. The back panel includes resilient flexible clips which have hooked ends, and the front panel includes rails which have projecting portions that engage the hooked ends of the clips. The assembly also includes C-shaped locating clips which aid in locating the assembly with respect to an aircraft structure to which the assembly is secured in an aircraft. The window shade is self-rolling, and the rolled portion of the shade is retained by contact with the C-shaped locating clips.

19 Claims, 3 Drawing Sheets

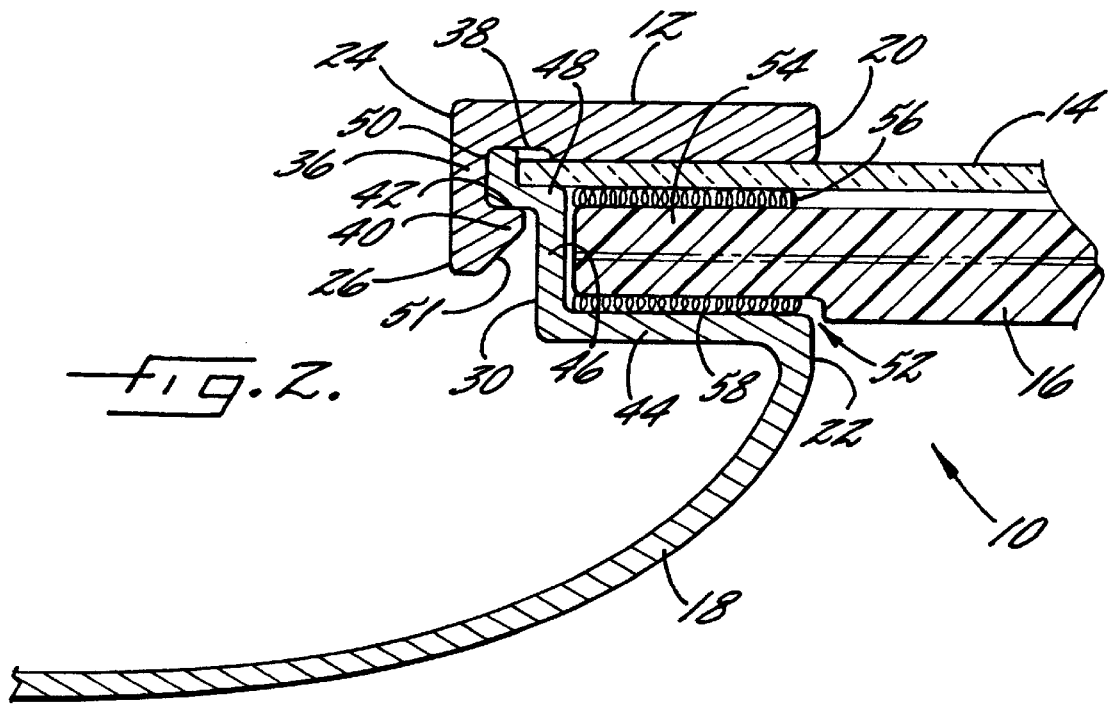

AIRCRAFT WINDOW ESCUTHCHEON ASSEMBLY

FIELD OF THE INVENTION

The present invention relates to an aircraft window escutcheon assembly.

BACKGROUND OF THE INVENTION

Passenger aircraft typically include windows for allowing passengers to see out from the aircraft. In larger passenger aircraft, and particularly commercial passenger transport aircraft, the passenger cabin usually includes interior panels attached to the inner walls of the cabin for improving the aesthetics of the interior. Some of the interior panels are provided with window openings which align with the primary windows in the cabin so that the view out of the windows is unobstructed by the panels. These panels are referred to herein as "window escutcheon assemblies". The window escutcheon assemblies also usually include window shades which can be drawn over the window openings in the panels to allow the passengers to shut the windows.

Aircraft interior cabin treatment commonly employs individual window escutcheon assemblies for the individual windows in the cabin. Each window escutcheon assembly includes panels having openings which align with a primary window in the cabin, and a window shade assembly. The assemblies attach to the side wall of the cabin or fuselage adjacent the window.

In existing window escutcheon assemblies, a substantial number of parts are employed for securing together the various components of an assembly including a front panel, a dust pane or acoustic pane, and a window shade. For example, in one known window escutcheon assembly, more than a dozen screws with accompanying washers and nuts are used. As a result, the assembly operation consumes a considerable amount of labor time and expense.

SUMMARY OF THE INVENTION

The present invention overcomes the drawbacks associated with prior window escutcheon assemblies noted above by providing a window escutcheon assembly in which no separate fasteners are required for securing together the panels of the assembly and the other components. The front and back panels of the assembly incorporate integral interlocking fastening portions so that the panels snap together to capture the dust pane and window shade and secure the entire assembly together. Accordingly, assembly time and cost are significantly reduced. Additionally, reduction in weight is achieved relative to prior assemblies.

To these ends, one preferred embodiment of the invention comprises a back panel having a window opening and including resiliently flexible clips projecting from an inner surface of the back panel. A transparent dust pane is disposed against the inner surface of the back panel to cover the window opening. A front panel having a window opening includes a pair of rails projecting from an inner surface of the front panel. The rails engage the clips on the back panel for securing the front and back panels together. The front panel includes retainers which contact the dust pane to capture the dust pane between the front and back panels. A window shade is disposed between the front panel and the dust pane and is slidable for variably covering the window opening in the front panel.

Preferably each of the clips comprises a generally L-shaped projection from the inner surface of the back panel including a first leg attached to and generally normal to the inner surface of the back panel and a second leg which is generally normal to the first leg and extends inwardly toward the window opening in the back panel. Each rail preferably includes a projecting portion which extends outwardly toward the first leg of the L-shaped projection and engages the second leg of the L-shaped projection to secure the front and back panels together. The retainers for capturing the dust pane comprise inward portions of the rail projecting portions, the inward portions bearing against the dust pane.

Alternatively, the L-shaped projections of the back panel include a second leg which extends outwardly away from the window opening, and the projecting portion of the rail extends inwardly toward the first leg of the L-shaped projection and engages the second leg to secure the panels together. In this embodiment, the front panel preferably includes flange portions which extend outwardly from adjacent the window opening along the side edges of the front panel and parallel to the dust pane, and the retainers project from the flange portions and bear against the dust pane. The rail projecting portion which engages the L-shaped clips is attached to the flange portion via a spacer portion which projects from the flange portion.

The flange portions advantageously are spaced from the dust pane to define slots therebetween. The window shade includes edge portions which are slidably engaged in the slots. Preferably, strips of resilient compressible material are disposed between the dust pane and the window shade and between the window shade and the flange portions for frictionally gripping the window shade to hold the shade in a partially drawn position.

The back panel preferably includes a plurality of the resiliently flexible clips located on opposite sides of the window opening and spaced apart along a direction defining a direction of movement for the sliding window shade. Additionally, the back panel further includes at least one resiliently flexible clip adjacent the bottom edge of the panel. Correspondingly, the front panel preferably includes a pair of rails extending along the direction of movement and spaced on opposite sides of the window opening in the front panel for engaging the clips on the back panel.

The front panel preferably includes a pair of C-shaped locating clips on its inner surface adjacent the top edge of the panel for engaging an aircraft structure to facilitate properly locating the window escutcheon assembly with respect to the structure. The front panel further includes a plurality of fasteners projecting from its inner surface for securing the window escutcheon assembly to a structure within the aircraft.

The window shade preferably is a self-rolling shade. The rolled end portion of the shade is retained between the C-shaped locating clips and the top edge of the back panel.

The invention thus provides an aircraft window escutcheon assembly which can be assembled without the need for additional separate fasteners for securing the panels of the assembly together to capture the dust pane and window shade, and which accordingly permits savings in labor and material costs for assembling the assembly, as well as savings in weight of the assembly.

BRIEF DESCRIPTION OF THE DRAWINGS

Additional objects, features, and advantages of the invention will become apparent from the following description of specific embodiments thereof, when taken in conjunction with the accompanying drawings in which:

FIG. 2 is a fragmentary cross-sectional view of the assembled window escutcheon assembly according to a first embodiment thereof;

FIG. 3 is a cross-sectional view similar to FIG. 2, showing a second embodiment of the window escutcheon assembly;

DETAILED DESCRIPTION OF THE DRAWINGS

Figure 1:
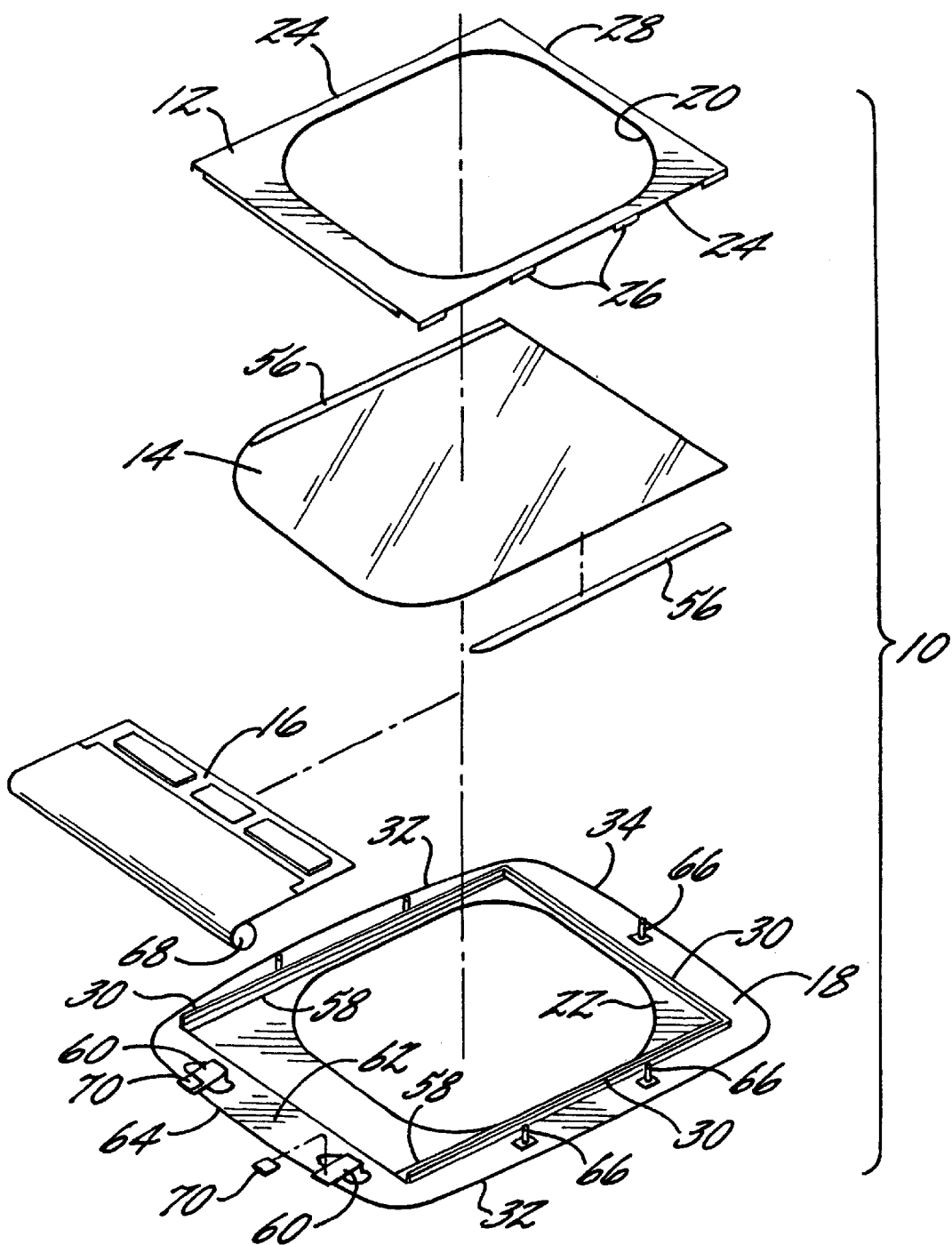
FIG. 1 is a an exploded perspective view of an embodiment of a window escutcheon assembly in accordance with the invention.

With reference to FIG. 1, a window escutcheon assembly 10 in accordance with the invention is shown. The assembly 10 includes a back panel 12, dust pane 14, window shade 16, and front panel 18.

The back panel 12 comprises a generally rectangular panel, preferably constructed of polycarbonate, although non-rectangular panel shapes and other materials may alternatively be used. The back panel 12 has a window opening 20. When the assembly 10 is installed in an aircraft, the window opening 20 will be aligned with the primary window in the aircraft cabin.

The dust pane 14 comprises a pane of transparent shatterproof material such as PLEXIGLAS® or the like. The dust pane 14 is disposed against the back panel 12 to cover the window opening 20. Accordingly, the perimeter of the dust pane 14 is slightly larger than the perimeter of the window opening 20. The window shade 16 preferably comprises a self-rolling shade formed of MYLAR® or the like.

The front panel 18 comprises a generally rectangular panel, preferably constructed of polycarbonate, and includes a window opening 22. As further described below, the front panel 18 attaches to the back panel 12 to capture and retain the dust pane 14 and window shade 16 between the panels. The resulting assembly is mounted as a unit into a sidewall panel and the sidewall panel is installed onto an aircraft cabin side wall with the window openings 20 and 22 in registration with one of the primary aircraft windows in the fuselage, as further described below in connection with FIGS. 4A and 4B.

The front panel 18 and back panel 12 are secured together via cooperating interlocking portions of the panels. Thus, along each side edge 24 of the back panel 12 are a plurality of flexible resilient clips 26 which are integrally formed with the back panel 12. The bottom edge 28 of back panel 12 preferably also includes clips 26. The front panel 18 includes rails 30 which extend along each side edge 32 and the bottom edge 34 thereof. The clips 26 on the back panel 12 engage the rails 30 on the front panel 18 in a snap-fit manner to secure the panels together.

With reference to FIG. 2, a clip 26 and corresponding rail 30 are depicted in greater detail. The clip 26 comprises a generally L-shaped projection from the back panel 12. A first leg 36 of the L-shaped projection projects generally normally from the inner surface 38 of the back panel adjacent the side edge 24. A second leg 40 projects normally from the first leg 36 in an inward direction toward the window opening 20. The second leg 40 thus comprises a hooked end of the clip 26 which has an engaging surface 42 spaced from and generally parallel to the inner surface 38 of the back panel 12.

The rail 30 engages this engaging surface 42 to secure the panels together. The front panel 18 is turned outward at the window opening 22 to define a flange portion 44 of the front panel 18 which extends parallel to the back panel 12. The rail 30 projects from the flange portion 44. The rail 30 has a generally L-shaped cross-section and includes a spacer portion 46 which extends normally from the flange portion 44 toward the back panel 12, and a projecting portion 48 which projects normally from the spacer portion 46 outward toward the clip 26. The projecting portion 48 of the rail 30 snaps into the space between the hooked end 40 of the clip 26 and the inner surface 38 of the back panel 12, and engagement of the projecting portion 48 with the engaging surface 42 prevents the front and back panels from being separated. The outer end of the projecting portion 48 also includes a lip 50 which abuts the inner surface 38 of the back panel 12 when the panels are assembled to insure a snug connection therebetween. The hooked end 40 of the clip 26 advantageously has a camming surface 51 which is contacted by the lip 50 of the rail 30 as the panels are being moved toward each other for deflecting the clips outwardly and/or the rail inwardly to permit the engaging surface 42 of the clip to engage the projecting portion 48 of the rail.

The dust pane 14 is captured and retained between the projecting portion 48 of the rail 30 and the inner surface 38 of the back panel 12. The spacer portion 46 of the rail 30 spaces the flange portion 44 of the front panel 18 away from the dust pane 14 to define a slot 52 therebetween. An edge portion 54 of the window shade 16 slidably engages the slot 52. The window shade 16 is thus retained between the front panel 18 and the dust pane 14 and can be slid up and down for opening and closing the window opening 22.

Strips 56 of resilient compressible material are affixed to the portion of the dust pane 14 within the slot 52, and similar strips 58 of resilient compressible material are affixed to the flange portion 44 within the slot 52. The strips 56 and 58 take up excess space between the window shade 16 and the dust pane 14 and flange portion 44 so that the window shade is firmly gripped between the dust pane 14 and flange portion 44 so that the shade 16 will be held fixed when placed in a partially drawn position. The strips 56 and 58 preferably are made of nylon loop material such as the loop portion of the hook-and-loop fastening system marketed under the trademark VELCRO®.

The window escutcheon assembly 10 also includes a pair of C-shaped clips 60 which aid in properly locating the assembly with respect to the aircraft structure to which the assembly is affixed. The clips 60 are attached to the inner surface 62 of the front panel 18 adjacent the top edge 64 thereof.

The assembly 10 includes a plurality of fasteners 66 which project from the inner surface 62 of the front panel 18 for securing the assembly 10 in place over the aircraft window. The fasteners 66 engage receptacles in the aircraft side wall and are secured within the receptacles simply by pushing the assembly 10 against the side wall until the fasteners 66 fully snap into the receptacles. The fasteners 66 preferably are Tinnerman fasteners.

The window shade 16 preferably is a self-rolling shade. The rolled portion 68 of the shade 16 rests against the outer surfaces of the C-shaped locating clips 60, which are convexly curved for receiving and retaining the rolled portion 68. Nylon loop material 70 is attached to the surfaces of the clips 60 which contact the rolled portion 68 to allow the rolled portion 68 to slip more readily with respect to the clips 60 as it rolls and unrolls.

FIG. 3 depicts an alternative embodiment of the invention in which the back panel 12 includes clips 26' in which the hooked end 40' turns outward rather than inward. Correspondingly, the front panel 18 has rails 30' in which the projecting portion 48' projects inward rather than outward, so as to engage the hooked end 40'. In this embodiment, a retainer 47 which is separate from the rail 30' projects from the flange portion 44 of the front panel 18 to contact the dust pane 14 for capturing and retaining the dust pane 14 between the front and back panels.

Figure 4A:
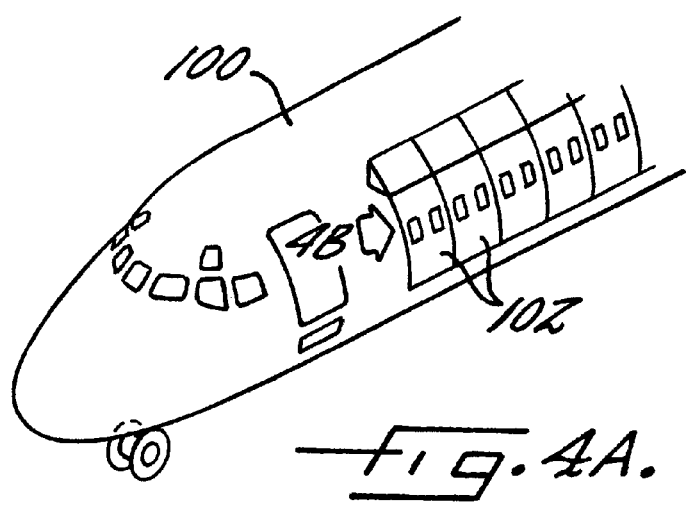
FIG. 4A is a schematic partial view of an aircraft depicting a plurality of sidewall panels mounted in the aircraft cabin.
Figure 4B:
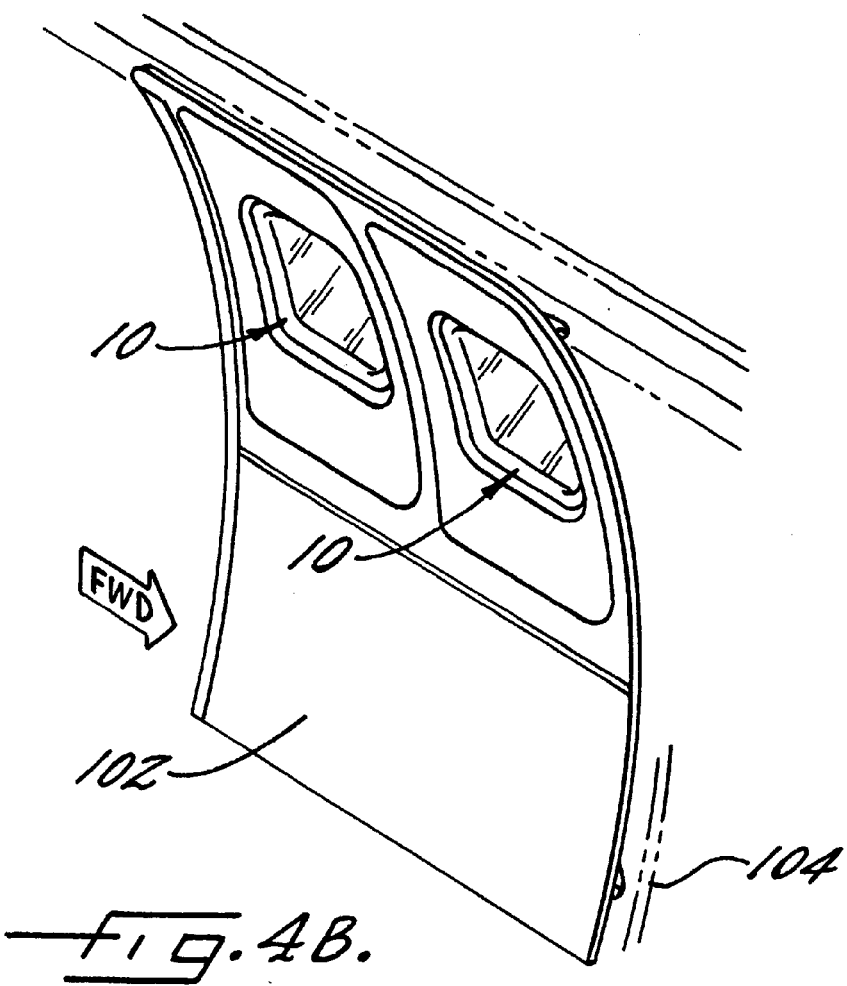
FIG. 4B is a view showing a pair of window escutcheon assemblies in accordance with one embodiment of the invention mounted in a sidewall panel and installed in an aircraft.

The assembly 10 mounts within a sidewall panel of an aircraft interior cabin treatment. FIG. 4A depicts an aircraft 100 in which a plurality of sidewall panels 102 are installed, and FIG. 4B shows one of the sidewall panels 102 in greater detail. The sidewall panel 102 houses a pair of window escutcheon assemblies 10 in accordance with the invention. The sidewall panel 102 is attached to the aircraft cabin side wall 104. The fasteners 66 (FIG. 1) projecting from the front panel 18 of the assembly 10 engage receptacles (not shown) in the aircraft cabin side wall 104.

It will be appreciated from the foregoing description of particular embodiments of the invention that the invention provides a window escutcheon assembly using relatively few parts which can be assembled relatively quickly, thus saving significant labor time and expense in assembling the assembly. The invention also achieves reduced weight by eliminating a substantial number of parts relative to prior window escutcheon assemblies.

Although the invention has been explained by reference to specific embodiments thereof, the invention is not limited to the particular details of these illustrative embodiments. Modifications may be made to these embodiments without departing from the scope of the invention. For example, although the assembly 10 has been described as having a plurality of discrete clips 26 on the back panel 12 and rails 30 on the front panel 18, alternatively the front panel may have discrete clips such as clips 26 and the back panel may have rails such as rails 30. Furthermore, the back panel may have a continuous clip instead of a plurality of discrete clips, the continuous clip engaging a rail on the front panel. Likewise, although the term "rail" has been used in connection with the integral fastening portion 30 of the front panel 18, the rail 30 need not be a continuous structure as illustrated, but may be a plurality of discrete structures similar to the rails 30. Thus, the terms "clip" and "rail" are not to be taken as limiting. Other modifications may also be made. Accordingly, the scope of the invention to be determined by reference to the appended claims.

What is claimed is:

1. An aircraft window escutcheon assembly comprising:
   a back panel having a window opening therein and including resiliently flexible clips projecting from an inner surface of the back panel;
   a transparent dust pane disposed against the inner surface of the back panel to cover the window opening therein;
   a front panel having a window opening therein and including at least one rail which projects from and extends along an inner surface of the front panel and engages the clips for securing the front panel to the back panel and capturing the dust pane therebetween; and
   a window shade disposed between the front panel and the dust pane and slidable therebetween for variably covering the window opening in the front panel.

2. The window escutcheon assembly of claim 1, wherein each of the clips includes a hooked end, and each of the rails includes a projection which engages the hooked ends of the clips to secure the front panel to the back panel.

3. The window escutcheon assembly of claim 2 wherein the back panel has opposite side edges spaced on opposite sides of the window opening in the back panel, and a plurality of said clips spaced apart along each of the side edges of the back panel, and wherein the rail extends along the front panel on opposite sides of the window opening in the front panel for engaging the clips on the back panel.

4. The window escutcheon assembly of claim 3 wherein each of the clips includes a first portion projecting away from the inner surface of the back panel and a second portion projecting from the first portion generally parallel to the back panel.

5. The window escutcheon assembly of claim 3 wherein the front panel includes a flange portion along each of the side edges, the flange portions being generally parallel to the dust pane and spaced from the dust pane to define slots between the dust pane and the flange portions, the window shade having edge portions which are slidably engaged in the slots.

6. The window escutcheon assembly of claim 5, further comprising strips of compressible resilient material disposed between the dust pane and the edge portions of the window shade and between the flange portions and the edge portions for holding the window shade in a partially drawn position.

7. The window escutcheon assembly of claim 3 wherein the back panel further comprises at least one of said clips positioned along a bottom edge of the back panel, and the front panel further comprises a rail extending along a bottom edge of the front panel for engaging the corresponding clip on the back panel.

8. The window escutcheon assembly of claim 1 wherein the front panel further comprises a plurality of fasteners projecting from the inner surface thereof for securing the window escutcheon assembly to a structure within an aircraft.

9. The window escutcheon assembly of claim 1, further comprising a pair of generally C-shaped locating clips on the inner surface of the front panel for engaging an aircraft structure to facilitate mounting the window escutcheon assembly to said aircraft structure.

10. The window escutcheon assembly of claim 9 wherein the window shade comprises a self-rolling window shade, a portion of the window shade adjacent one end thereof defining a rolled portion, the rolled portion being retained by the C-shaped locating clips contacting an outer surface of the rolled portion.

11. The window escutcheon assembly of claim 1 wherein each of the clips comprises a generally L-shaped projection from the inner surface of the back panel including a first leg attached to and generally normal to the inner surface and a second leg which is generally normal to the first leg and extends inwardly toward the window opening in the back panel, and the rail includes a projecting portion which extends outwardly toward the first leg of the L-shaped projection and engages the second leg of the L-shaped projection to secure the front and back panels together.

12. The window escutcheon assembly of claim 11 wherein inward portions of the projecting portions of the rails bear against the dust pane to capture the dust pane between the front and back panels.

13. The window escutcheon assembly of claim 1 wherein each of the clips comprises a generally L-shaped projection from the inner surface of the back panel including a first leg attached to and generally normal to the inner surface and a second leg which is generally normal to the first leg and extends outwardly away from the window opening in the back panel, and the rail includes a projecting portion which extends inwardly toward the first leg of the L-shaped projection and engages the second leg of the L-shaped projection to secure the front and back panels together.

14. The window escutcheon assembly of claim 13 wherein the front panel includes flange portions which extend outwardly from adjacent the window opening and parallel to the dust pane, and retainers which project from the flange portions and bear against the dust pane for capturing the dust pane between the front and back panels.

15. The window escutcheon assembly of claim 14 wherein the projecting portion of the rail which engages the L-shaped clips is attached to the flange portion via a spacer portion which projects therefrom.

16. An aircraft window escutcheon assembly comprising:

a back panel having a window opening therein;

a transparent dust pane disposed against an inner surface of the back panel to cover the window opening therein; and a front panel having a window opening therein;

one of the front and back panels including resiliently flexible clips projecting from an inner surface of said one of the panels, each of the clips including a hooked end, and the other of the front and back panels including at least one rail which projects from and extends along an inner surface of said other panel, the rail including a projection which engages the hooked ends of the clips to secure the front panel to the back panel and capture the dust pane therebetween.

17. The window escutcheon assembly of claim 16, wherein the back panel has opposite side edges spaced on opposite sides of the window opening in the back panel, and said clips project from the inner surface of the back panel and are spaced apart along each of the side edges of the back panel, and wherein the rail extends along the front panel on opposite sides of the window opening in the front panel for engaging the clips on the back panel.

18. The window escutcheon assembly of claim 17 wherein each of the clips comprises a generally L-shaped projection from the inner surface of the back panel including a first leg attached to and generally normal to the inner surface and a second leg which is generally normal to the first leg and extends outwardly away from the window opening in the back panel, and the rail includes a projecting portion which extends inwardly toward the first leg of the L-shaped projection and engages the second leg of the L-shaped projection to secure the front and back panels together.

19. The window escutcheon of claim 17 wherein each of the clips comprises a generally L-shaped projection from the inner surface of the back panel including a first leg attached to and generally normal to the inner surface and a second leg which is generally normal to the first leg and extends inwardly toward the window opening in the back panel, and the rail includes a projecting portion which extends outwardly toward the first leg of the L-shaped projection and engages the second leg of the L-shaped projection to secure the front and back panels together.

* * * * *